United States Patent
Pipko et al.

(10) Patent No.: US 7,820,122 B2
(45) Date of Patent: Oct. 26, 2010

(54) METHOD FOR REMOVING MERCURY FROM WASTE GAS

(75) Inventors: Gregory Pipko, Katzrin (IL); Albert Meintz, Katzrin (IL); Haim Sterenfine, Katzrin (IL); Aharon Arnon, Katzrin (IL)

(73) Assignee: Lextran Ltd., Katzrin (IL)

( * ) Notice: Subject to any disclaimer, the term of this patent is extended or adjusted under 35 U.S.C. 154(b) by 1169 days.

(21) Appl. No.: 10/596,400

(22) PCT Filed: Dec. 12, 2004

(86) PCT No.: PCT/IL2004/001120

§ 371 (c)(1),
(2), (4) Date: Jun. 12, 2006

(87) PCT Pub. No.: WO2005/056160

PCT Pub. Date: Jun. 23, 2005

(65) Prior Publication Data

US 2007/0092417 A1    Apr. 26, 2007

(30) Foreign Application Priority Data

Dec. 10, 2003    (IL)    ..................... 159305

(51) Int. Cl.
*B01D 53/14* (2006.01)
(52) U.S. Cl. ........................... 423/210; 95/188; 95/206; 95/234
(58) Field of Classification Search ................. 423/210, 423/101, 575, 574; 95/107, 188, 190, 206, 95/234
See application file for complete search history.

(56) References Cited

U.S. PATENT DOCUMENTS

| 3,953,586 | A | * | 4/1976 | Tanimura | .................... 423/575 |
| 5,207,877 | A | * | 5/1993 | Weinberg et al. | ........... 423/210 |
| 5,419,834 | A | | 5/1995 | Straten | |
| 5,512,526 | A | * | 4/1996 | Greco | ......................... 502/80 |
| 6,881,243 | B1 | * | 4/2005 | Khitrik et al. | .................. 95/188 |
| 6,942,840 | B1 | * | 9/2005 | Broderick | .................... 423/101 |
| 7,361,209 | B1 | * | 4/2008 | Durham et al. | ............... 95/107 |

FOREIGN PATENT DOCUMENTS

WO    01/26784    4/2001

OTHER PUBLICATIONS

"Chemical Process Design Alternatives to Gain Simultaneous NOx Removal in Scrubber " presented by Ellison at POWER-GEN International, Dec. 9-11, 2003.*
William Ellison, "Chemical process design alternatives to gain simultaneous NOx removal in scrubbers," Ellison Consultants Paper for Presentation at Power-Gen International, XP002324631, pp. 1-11; 7-8, Dec. 9, 2007.
Database Biosis Online! Biosciences Information Service, Philadelphia, PA, US, 1989, Jia J. et al., "Petroleum Sulfoxide Extract-Leach Resin a new Resin for treatment of Waste Water Containing Methylmercury".
Francis T. et al., "Liquid-Liquid Extraction of HG(II) from Acidic Chloride Solutions using BIS-2 Ethylhexyl Sulfoxide," Journal of Chemical Technology and Biotechnology, vol. 76, No. 7, Jul. 2001.

* cited by examiner

*Primary Examiner*—Duane Smith
*Assistant Examiner*—Ives Wu
(74) *Attorney, Agent, or Firm*—Lowe Hauptman Ham & Berner LLP

(57) ABSTRACT

A method for removing Hg (mercury) from waste gases is disclosed, the removing of the mercury (Hg) gas (vapors) is by contacting the waste gas with a scrubbing agent being organic sulfoxides either in pure form or as with an emulsion of water-in-organic sulfoxides. The waste gas can be any waste gas containing mercury gases or mercury vapors, such as combustion flue gas and waste gases generated in various chemical and industrial processes.

15 Claims, No Drawings

METHOD FOR REMOVING MERCURY FROM WASTE GAS

FIELD OF THE INVENTION

The present invention relates to a method for removing mercury from waste gases.

BACKGROUND OF THE INVENTION

Industrially developed countries generate billions of tons of air pollutants, a great part accounts to the combustion of coal, oil, and gasoline in electric power plants. Other major air pollution sources include petroleum refineries, cement plants and petrochemical plants.

Hg (mercury) is a naturally occurring metal used in a wide variety of applications ranging from the production of household bleach to the mining of gold. Hg is released into the environment either directly to water via waste systems, or much more commonly, directed to the atmosphere. It is this atmospheric pathway that is largely responsible for Hg contamination in the environment. The combustion of coal for energy production, and incineration of municipal and medical wastes, produces the majority of Hg deposited onto the watersheds.

In the atmosphere, Hg undergoes a wide variety of chemical transformations, eventually settling to the landscape as Hg attached to particulate matter such as soot. Once on the ground, Hg migrates through watersheds, arriving eventually into receiving waters (e.g. wetlands and lakes). Hg that is moving through watersheds is subject to myriad chemical transformations, and these are often biologically mediated. The most important of these biological transformations is the generation of methyl-mercury (Me-Hg). Me-Hg is a highly toxic form of Hg, which is easily assimilated into tiny planktonic organisms at the base of aquatic food chains. Through the processes of bio-magnification, minute concentrations of Me-Hg are passed up food chains, increasing to levels that pose a significant threat to those organisms feeding at the top of the aquatic food web. Organisms which are at risk of Me-Hg exposure include top-level carnivorous fish such as walleye, fish-eating birds such as eagle and loons, and, of course, humans. It is noteworthy that some fish species are better at getting rid of their Me-Hg burden than others.

The increasing environmental awareness during the last decades has led in many countries to governmental regulations, enforcing standards for maximum air pollutants emission on power plants and industries, in order to achieve air quality standards for various hazard materials. For example, in the U.S., the Clean Air Act of 1967 as amended in 1970, 1977, and 1990 is the legal basis for air-pollution control throughout the U.S.

The need to obey these regulations has led to the development of diversified methods for controlling and reducing the emission of air pollutants. In general, these methods include removing the hazardous material before it is used (for example, using low-content sulfur coal) or removing the pollutant after it is formed. For some air pollutants, only methods of the second class can be employed.

The present invention relates to methods of the second class.

Industrially emitted pollutant gases can be entrapped by liquids or solids traps that adsorb the harmful gases before they are released into the atmosphere. These traps are usually in the form of tower tanks contactors through which the waste gas is passed upward while the liquid, or a slurry, i.e. a mixture of liquids and solids, is descending downward. The agent which absorbs the pollutants and prevents their emitting into the atmosphere is called the scrubbing agent. When this agent is a liquid, it is sometimes the practice to fill the tower with inert particles in order to increase the contact surface between the scrubbing agent and the waste gas and to increase the residence time of the gas inside the reactor. In such cases it is also the practice to circulate the liquid scrubbing agent through the reactor until it is loaded with the pollutants.

SUMMARY OF THE INVENTION

The present invention relates to a method for removing mercury (Hg) gas (vapors), from waste gases by contacting the waste gas with a scrubbing agent being organic sulfoxides either in pure form or as with an emulsion of water-in-organic sulfoxides.

The waste gas can be any waste gas containing mercury gases or mercury vapors, such as combustion flue gas and waste gases generated in various chemical and industrial processes.

The organic sulfoxides are preferably oil-derived sulfoxides and in particular sulfoxides derived from diesel. The weight ratio of the water: organic sulfoxide in the emulsion is in the range 10:90 to 90:10, preferably in the range 10:90 to 50:50, most preferably 70% sulfoxide to 30% w/w of water.

The process of the present invention is carried out in an oxidation environment. Therefore if the waste gas mixture does not contain enough oxygen, an additional stream of air enriched with ozone (ozonated air) is added to the waste gas. Alternatively, oxidized water $H_2O_2$ may be used as the oxidation agent. In such a case the process may be used to eliminate Hg, as well as elimination of other toxic gases such as $SO_2$ and $NO_2$.

Where a water-in-organic sulfoxide emulsion is used the scrubbing agent can be regenerated after it is loaded, by letting said emulsion separate into two phases, collecting the upper sulfoxide phase and adding to said sulfoxide phase a fresh amount of aqueous solution.

According to the present invention, contacting the waste gas with the scrubbing agent can be conducted in a tower embedded with inert particles, wherein the waste gas is passed upward through the tower and the pure organic sulfoxide or the emulsion or water-in-organic sulfoxide is circulated downward in a rate which ensures complete wetting of inert particles or can be conducted in a tower through which the waste gas is passed in an upward direction and the emulsion is sprayed into the tower from the upper opening of the tower forming a fog of said emulsion inside the tower.

DETAILED DESCRIPTION OF THE INVENTION

Organic sulfoxides are known for their acid extraction properties. Of special interest are oil derived sulfoxides that are obtained by the oxidation of organic sulfides contained in oil. By oxidizing and extracting different fractions of oil, a mixture of sulfoxides is obtained, having molecular weight and boiling temperature according to the oil fraction from which they are derived. The diesel fraction (boiling temperature 190-360° C.) is in particular a good source for oil-derived-sulfoxides, since this fraction is relatively rich in sulfur and the sulfoxide mixture so obtained is a liquid of low-cost.

EXAMPLES

The following experiments demonstrate and clarify the present invention and do not intend to limit the scope of the invention by any way.

Example 1

In a glass tube having the following size: 500 mn length, diameter 30 mn, 70 ml sulfoxide were introduced into the glass tube. Air was blown from the compressor through the column at a rate of 1.5 l/min. Additional mercury (Hg) vapor (58 μg) were added to the original air blown. The mercury concentrations after contact with sulfoxide in the column were reduced to 0 microgram, meaning that virtually all the mercury was removed.

Mercury concentrations was determined according to EPA-101A Method by absorbing in $KM_nO_4/H_2SO_4$ solution and atomic absorption cold vapor analysts).

Example 2

The same procedure as in Example 1 was repeated, but instead of pure sulfoxide a mixture 35 ml sulfoxide+35 ml doucane (high boiling point aliphatic hydrocarbon solvent) was used. Mercury vapor concentration in air was 45 microgram before removal by column, and 0 microgram after column removal, so that here again all mercury was removed.

Example 3

The same procedure as in Example 1 was repeated, but instead of pure sulfoxide liquid emulsion containing 70 ml sulfoxide+30 ml water was used.

Mercury vapor concentration before column removal was 58 microgram, and after column removal, 0 microgram so that in this example as well all mercury was eliminated.

Example 4

The same procedure as in Example 3 was repeated but instead of air and mercury vapor, a mixture of air with $SO_2$ and mercury vapor: 1.5 l/mn air+1000 ppm, $SO_4$+58 microgram Hg was used.

pH in water phase was 4-6;

$SO_2$ absorption was by the column was 90%, Hg concentration after column was 0 microgram so that here as well all Hg was absorbed.

Example 5

The same procedure as in Example 4 was used, but instead of air, $SO_2$ and Kg vapors the following was used: air—1.5 l/min. $SO_2$—1000 ppm, $NO_2$—150 ppm, NO—100 ppm, Hg—58 microgram/m$^3$; pH water phase was 4÷6;

$SO_2$ absorption after column was 90%; $NO_2$ absorption after column was 75%;

$NO_2$ absorption was 50%.

Mercury concentration was 0 microgram after column scrubbing.

Example 6

The same procedure as in Example 2 was used, but instead of sulfoxide-doucan solution organic phase of sulfoxide (70 ml) with 30 ml water were emulsified and used. Mercury concentration before column was 135 microgram/r$^3$, after column—0 microgram/m$^3$.

As can be seen from the above the method of the invention was capable of eliminating virtually all mercury vapors.

Additional Experimental Data

Additional experimental data is attached in the following tables 1.1-1.5 and 2.1-2.3 of the Mercury Vapours Absorbtion Experiment performed according to the following details:

The Purpose of Experiment:
  To test the Mercury Vapours Absorbtion Efficiency by Laboratory-Scale Column with Absorbtion Liquids according to the present invention.

Test Methods:
  1. Mercury Vapours Analyser.
  2. Mercury Vapours Determination, based on EPA-101A Method. (absorbing in KMnO4/H2SO4 Solution and Atomic Absorbtion Cold Vapours Analysis).

Instruments and Apparates:
  1. JEROME Mercury Vapours Analyser. Low Detection Level—1 mcg/m$^3$ of Mercury Vapours.
  2. Personal Sampling Pumps (SKC AirChek-52, Flow Controller)
  3. BIOS DRICAL 5.0 Flowrate Calibrator (0.0001 L/min, Primary Standard).
  4. Midget Bubblers (Supelco, BoroSilicate Glass, 25 ml "dead volume").
  5. Mercury Vapours Generator.
  6. Lextran lab-scale Column (Absorber).

Final Results

1. Measurements by JEROME Mercury Vapours Analyser 1.1. Absorbing Solution: DAUKAN+30% Water Emulsion.

| Measure No. | Time HH:mm | Mercury Vapours Conc-n mcg/m3 | Remarks |
|---|---|---|---|
| Column Inlet | | | |
| 1 | 16:07 | 108 | Gas flowrate: 1.33 Lpm |
| | | 107 | |
| | | 93 | |
| | | 105 | |
| | Average | 103 | |
| Column Outlet | | | |
| 2 | 16:21 | 0 | Gas flowrate: 1.32 Lpm |
| | | 0 | |
| | | 0 | |
| | | 0 | |
| | Average | 0 | |

1.2. Absorbing Solution: SulfOxide 100%

| Measure No. | Time HH:mm | Mercury Vapours Conc-n mcg/m3 | Remarks |
|---|---|---|---|
| Column Inlet | | | |
| 1 | 16:32 | 58 | Gas flowrate: 1.46 Lpm |
| | | 59 | |
| | | 57 | |
| | | 57 | |
| | Average | 58 | |

-continued

| Measure No. | Time HH:mm | Mercury Vapours Conc-n mcg/m3 | Remarks |
|---|---|---|---|
| | | Column Outlet | |
| 2 | 16:39 | 0 | Gas flowrate: 1.44 Lpm |
| | | 0 | |
| | | 0 | |
| | | 0 | |
| | Average | 0 | |

1.3 Absorging solution: SulfOxide+30% Water Emulsion.

| Measure No. | Time HH:mm | Mercury Vapours Conc-n mcg/m3 | Remarks |
|---|---|---|---|
| | | Column Inlet | |
| 1 | 16:44 | 55 | Gas flowrate: 1.27 Lpm |
| | | 57 | |
| | | 56 | |
| | | 57 | |
| | Average | 56 | |
| | | Column Outlet | |
| 2 | 16:48 | 0 | Gas flowrate: 1.24 Lpm |
| | | 0 | |
| | | 0 | |
| | | 0 | |
| | Average | 0 | |

1.4 Absorbing Solution: SulfOxide+10% DAUKAN.

| Measure No. | Time HH:mm | Mercury Vapours Conc-n mcg/m3 | Remarks |
|---|---|---|---|
| | | Column Inlet | |
| 1 | 17:10 | 41 | Gas flowrate: not Measured |
| | | 45 | |
| | | 47 | |
| | | 44 | |
| | Average | 44 | |
| | | Column Outlet | |
| 2 | 17:14 | 0 | Gas flowrate: not Measured |
| | | 0 | |
| | | 0 | |
| | | 0 | |
| | Average | 0 | |

1.5 Absorbing Solution: SulfOxide+Additives+30% Water Emulsion.

| Measure No. | Time HH:mm | Mercury Vapours Conc-n mcg/m3 | Remarks |
|---|---|---|---|
| | | Column Inlet | |
| 1 | 17:30 | 35 | Gas flowrate: not Measured |
| | | 36 | |
| | | 40 | |
| | | 40 | |
| | Average | 38 | |
| | | Column Outlet | |
| 2 | 17:36 | 3 | Gas flowrate: not Measured |
| | | 4 | |
| | | 4 | |
| | | 4 | |
| | Average | 4 | |

2. Measurements by JEROME Mercury Vapours Analyser and EPA-101A Based Sampling (Simultaneously)

2.1. Absorbing Solution: SulfOxide+Additives+30% Water Emulsion.

| Measure No. | Sampling Time HH:mm | Sampling Time min | Sampling Flowrate Lpm | Gas Volume Sampled L | Sample Code | Sample Volume ml | Mercury Conc-n in the Sample mcg/L | Mercury Content in the Sample mcg | Mercury Conc-n in the Gas Stream mcg/m3 | Remarks | JEROME Reading mcg/m3 |
|---|---|---|---|---|---|---|---|---|---|---|---|
| | | | | | Column Inlet | | | | | | |
| 1 | 18:07-19:07 | 60 | 0.372 | 22.32 | G-1533 | 15.2 | 28 | 0.426 | 19.1 | | 27 |
| | | | | | Column Outlet | | | | | | |
| 2 | 18:07-19:07 | 60 | 1.219 | 73.14 | G-1534 | 15.0 | 5 | 0.075 | 1.03 | < LOD | 3 |

2.2 Absorbing Solution: DAUKAN 100%

| Measure No. | Sampling Time HH:mm | Sampling Time min | Sampling Flowrate Lpm | Gas Volume Sampled L | Sample Code | Sample Volume ml | Mercury Conc-n in the Sample mcg/L | Mercury Content in the Sample mcg | Mercury Conc-n in the Gas Stream mcg/m3 | Remarks | JEROME Readings mcg/m3 |
|---|---|---|---|---|---|---|---|---|---|---|---|
| | | | | Column Inlet | | | | | | | |
| 3 | 19:22-20:22 | 60 | 0.446 | 26.76 | G-1535 | 15.0 | 38 | 0.570 | 21.3 | | 20 |
| | | | | Column Outlet | | | | | | | |
| 4 | 19:22-20:22 | 60 | 1.218 | 73.08 | G-1536 | 15.0 | 5 | 0.075 | 1.03 | <LOD | 0 |

2.3 Mercury Concentration in Absorbing Solution: SulfOxide+10% DAUKAN.
Sample Code: G-1537
Mercury Concentration in the Sample: 7 mcg/L

The invention claimed is:

1. A method for removing mercury vapors from waste gas comprising contacting said waste gas with a scrubbing agent comprising organic sulfoxides.

2. A method according to claim 1, wherein the scrubbing agent is essentially pure organic sulfoxides.

3. A method according to claim 1, wherein the scrubbing agent is an emulsion of water-in-organic sulfoxides.

4. A method according to claim 1 wherein the waste gas is a combustion flue gas.

5. A method according to claim 1 wherein the waste gas is a gas mixture released from a chemical process.

6. A method according to claim 1 wherein a stream of air or of ozonated air is added to the stream of waste gas.

7. A method according to claim 1 wherein the organic sulfoxides are oil derived sulfoxides.

8. A method according to claim 6 wherein the oil derived sulfoxides are derived from the diesel fraction of oil.

9. A method according to claim 3 wherein the weight ratio of water: organic sulfoxide in the emulsion is in the range 10:90 to 90:10.

10. A method according to claim 9 wherein the weight ratio of water: organic sulfoxide in the emulsion is in the range 10:90 to 50:50.

11. A method according to claim 9 wherein the weight ratio of water: organic sulfoxide in the emulsion is in the range 30:70 w/w/.

12. A method according to claim 3 wherein the scrubbing agent is regenerated after it is loaded, by letting said scrubbing agent to separate into two phases, collecting the upper sulfoxide phase and adding to said sulfoxide phase a fresh amount of aqueous solution.

13. A method according to claim 1 wherein contacting the waste gas with said scrubbing agent is conducted in a tower embedded with inert particles and wherein the waste gas is passed upward through the tower and the scrubbing agent is circulated downward in a rate which ensures complete wetting of inert particles.

14. A method according to claim 1 wherein contacting the waste gas with said scrubbing agent is conducted in a tower through which the waste gas is passed in an upward direction and the scrubbing agent is sprayed into the tower from the upper opening of the tower forming a fog of said scrubbing agent the tower.

15. A method according to claim 1 wherein the contacting is in an oxidation environment.

* * * * *